United States Patent
Ohno et al.

(10) Patent No.: US 9,937,891 B2
(45) Date of Patent: Apr. 10, 2018

(54) VEHICLE AIRBAG DEVICE

(71) Applicant: TOYOTA JIDOSHA KABUSHIKI KAISHA, Toyota-shi, Aichi-ken (JP)

(72) Inventors: Mitsuyoshi Ohno, Miyoshi (JP); Akihisa Miyata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/334,850

(22) Filed: Oct. 26, 2016

(65) Prior Publication Data

US 2017/0120859 A1    May 4, 2017

(30) Foreign Application Priority Data

Nov. 2, 2015 (JP) ................. 2015-215841

(51) Int. Cl.
| | |
|---|---|
| *B60R 21/272* | (2006.01) |
| *B60R 21/205* | (2011.01) |
| *B60R 21/2338* | (2011.01) |
| *B60R 21/2342* | (2011.01) |
| *B60R 21/276* | (2006.01) |
| *B60R 21/239* | (2006.01) |
| *B60R 21/235* | (2006.01) |
| *B60R 21/26* | (2011.01) |

(52) U.S. Cl.
CPC .......... *B60R 21/272* (2013.01); *B60R 21/205* (2013.01); *B60R 21/239* (2013.01); *B60R 21/2338* (2013.01); *B60R 21/2342* (2013.01); *B60R 21/276* (2013.01); *B60R 2021/2395* (2013.01); *B60R 2021/23509* (2013.01); *B60R 2021/26058* (2013.01); *B60R 2021/2765* (2013.01)

(58) Field of Classification Search
CPC . B60R 21/272; B60R 21/205; B60R 21/2338; B60R 21/239; B60R 21/276; B60R 2021/2395; B60R 2021/26058; B60R 2021/2765
USPC ................................................ 280/736, 743.2
See application file for complete search history.

(56) References Cited

U.S. PATENT DOCUMENTS

| | | | |
|---|---|---|---|
| 5,582,428 A | 12/1996 | Buchanan et al. | |
| 5,887,894 A * | 3/1999 | Castagner | ............. B60R 21/217 280/735 |
| 6,019,389 A | 2/2000 | Burgi et al. | |

(Continued)

FOREIGN PATENT DOCUMENTS

| | | | | |
|---|---|---|---|---|
| JP | 2000071911 A | * | 3/2000 | ............. B60R 21/16 |
| JP | 2004-262427 A | | 9/2004 | |

(Continued)

*Primary Examiner* — Faye M Fleming
(74) *Attorney, Agent, or Firm* — Oliff PLC

(57) ABSTRACT

A vehicle airbag device is provided, the vehicle airbag device including (1) an airbag that is folded and stowed inside an airbag case, the airbag being inflated and deployed on being supplied with gas, (2) a mid-collision gas supply section that supplies gas into the airbag during a vehicle collision, and (3) a pre-collision gas supply section that, in a case in which it has been determined prior to a vehicle collision that a vehicle collision is unavoidable, supplies gas into the airbag at a lower temperature than a temperature of gas supplied into the airbag from the mid-collision gas supply section.

4 Claims, 7 Drawing Sheets

(56) References Cited

U.S. PATENT DOCUMENTS

| | | | |
|---|---|---|---|
| 7,261,320 B2* | 8/2007 | Fredin | B60R 21/233 280/735 |
| 7,922,197 B2* | 4/2011 | Fukawatase | B60R 21/233 280/739 |
| 8,157,291 B2* | 4/2012 | Mayer | B60R 21/0134 280/735 |
| 8,196,955 B2* | 6/2012 | Mendez | B60R 21/231 280/729 |
| 2003/0034642 A1 | 2/2003 | Blakemore et al. | |
| 2004/0017069 A1 | 1/2004 | Fischer | |
| 2004/0046376 A1 | 3/2004 | Ryan | |
| 2006/0214398 A1 | 9/2006 | Fredin et al. | |
| 2006/0214406 A1 | 9/2006 | Parkinson et al. | |
| 2008/0082236 A1 | 4/2008 | Asaoka | |
| 2009/0302588 A1* | 12/2009 | Schramm | B60R 21/233 280/743.2 |
| 2009/0309341 A1 | 12/2009 | Pausch | |
| 2010/0078924 A1 | 4/2010 | Mitsuo et al. | |
| 2010/0201107 A1 | 8/2010 | Abe et al. | |
| 2010/0244419 A1* | 9/2010 | Maripudi | B60R 21/233 280/743.2 |
| 2012/0292897 A1* | 11/2012 | Puzzonia | B60R 21/233 280/741 |
| 2013/0038046 A1 | 2/2013 | Inuzuka et al. | |

FOREIGN PATENT DOCUMENTS

| | | |
|---|---|---|
| JP | 2008-087518 A | 4/2008 |
| JP | 2008-534352 A | 8/2008 |
| JP | 2008-308139 A | 12/2008 |
| JP | 2009-001259 A | 1/2009 |
| JP | 2009-298222 A | 12/2009 |
| JP | 2010-083175 A | 4/2010 |
| JP | 2013-035473 A | 2/2013 |

* cited by examiner

VEHICLE AIRBAG DEVICE

CROSS-REFERENCE TO RELATED APPLICATION

This application claims priority under 35 USC 119 from Japanese Patent Application No. 2015-215841 filed on Nov. 2, 2015, the disclosure of which is incorporated by reference herein.

BACKGROUND

Technical Field

The present disclosure relates to a vehicle airbag device.

Related Art

As an airbag device including plural gas supply sections supplying gas into an airbag, Japanese Patent Application Laid-Open (JP-A) No. 2008-308139 describes a configuration in which a gas generation unit is configured in two stages, in which a first stage and a second stage gas generation unit are actuated at the same time in cases in which an occupant has a large build, and only the first state gas generation unit is actuated in cases in which the occupant has a small build. Japanese National-Phase Publication No. 2008-534352 describes a structure in which a first inflator and a second inflator are actuated in sequence to greatly inflate and deploy an airbag in a state prior to a collision after a vehicle collision has been predicted. Japanese National-Phase Publication No. 2008-534352 is also configured such that only the second inflator is actuated to inflate and deploy the airbag to a lesser extent in a state in which a vehicle collision has been detected without the vehicle collision being able to be predicted.

However, in the technology described in JP-A No. 2008-308139, gas is not supplied into the airbag until a vehicle collision is detected, such that there is room for improvement from the perspective of improving initial restraint performance of the occupant compared to configurations in which the airbag is inflated and deployed prior to a collision. In the technology described in Japanese National-Phase Publication 2008-534352, although the internal pressure of the airbag can be maintained to a certain extent compared to cases in which only one inflator is employed, the internal pressure falls due to a drop in the gas temperature and so on, and so there is further room for improvement from the perspective of maintaining the internal pressure of the airbag until a collision has occurred.

SUMMARY

The present disclosure obtains a vehicle airbag device capable of maintaining internal pressure of an airbag until a collision has occurred, while improving initial restraint performance of an occupant.

A first aspect of the present disclosure is a vehicle airbag device including (i) an airbag that is folded and stowed inside an airbag case, the airbag being inflated and deployed on being supplied with gas, (ii) a mid-collision gas supply section that is provided at the airbag case, the mid-collision gas supply section supplying gas into the airbag during a vehicle collision, and (iii) a pre-collision gas supply section that is provided at the airbag case, the pre-collision gas supply section supplying gas into the airbag at a lower temperature than a temperature of gas supplied into the airbag from the mid-collision gas supply section, in a case in which it has been determined prior to a vehicle collision that a vehicle collision is unavoidable.

In the vehicle airbag device according to the first aspect, gas is supplied from the pre-collision gas supply section into the airbag if it has been determined that a vehicle collision is unavoidable. Gas is then supplied from the mid-collision gas supply section into the airbag during the vehicle collision. This enables the airbag to be inflated prior to the vehicle collision, and gas to be further supplied into the airbag during the vehicle collision. Thus since, at a front-end collision of the vehicle, the airbag has already been inflated and deployed, for example, movement under inertia of an occupant toward the vehicle front can be restrained by the airbag, and initial restraint performance of the occupant can be improved.

Gas supplied into the airbag from the pre-collision gas supply section is gas at a lower temperature than gas supplied into the airbag from the mid-collision gas supply section. This enables a drop in the internal pressure of the airbag due to a drop in gas temperature to be suppressed. During the collision, gas is supplied into the airbag at a higher temperature than gas supplied into the airbag from the pre-collision gas supply section. The temperature of gas that has been filled into the airbag rises accordingly, thereby enabling the internal pressure of the airbag to be raised.

A second aspect of the present disclosure is the vehicle airbag device of the first aspect, further including a tether that is attached to the airbag, the tether covering at least a part of a vent hole formed in the airbag during inflation and deployment of the airbag, and an actuator that releases an attached state of the tether so as to open the vent hole during a vehicle collision or after a vehicle collision.

In the vehicle airbag device according to the second aspect, the vent hole is formed in the airbag, and at least a part of the vent hole is covered by the tether that is attached to the airbag. The attached state of the tether is released by the actuator during a vehicle collision or after a vehicle collision, such that the vent hole is opened and some of the gas inside the airbag is discharged to the exterior. This enables an excessive rise in the internal pressure of the airbag when the occupant is being restrained to be suppressed, even in cases in which gas has been supplied into the airbag from the mid-collision gas supply section during a collision.

A third aspect of the present disclosure is the vehicle airbag device of the second aspect, wherein the actuator is connected to a gas flow-path through which gas generated in the mid-collision gas supply section flows, and the actuator releases the attached state of the tether on receiving gas supplied from the mid-collision gas supply section.

In the vehicle airbag device according to the third aspect, the actuator releases the attached state of the tether on receiving gas supplied from the mid-collision gas supply section. There is accordingly no need to provide a separate drive source to release the attached state of the tether.

As explained above, the vehicle airbag device according to the first aspect enables the internal pressure of the airbag to be maintained until a collision has occurred, while improving initial restraint performance of the occupant.

The vehicle airbag device according to the second aspect enables the internal pressure inside the airbag to be optimized when restraining the occupant.

The vehicle airbag device according to the third aspect enables the number of components to be reduced.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a vehicle airbag device according to a first exemplary embodiment, with reference to the drawings. Note that the arrow FR indicates the vehicle front side and the arrow UP indicates the vehicle upward in each of the drawings as appropriate. In the below explanation, unless specifically stated otherwise, reference to the front-rear, up-down, and left-right directions refers to front and rear in the vehicle front-rear direction, up and down in the vehicle vertical direction, and left and right when facing the direction of travel.

Configuration of Vehicle Airbag Device

Figure 1:
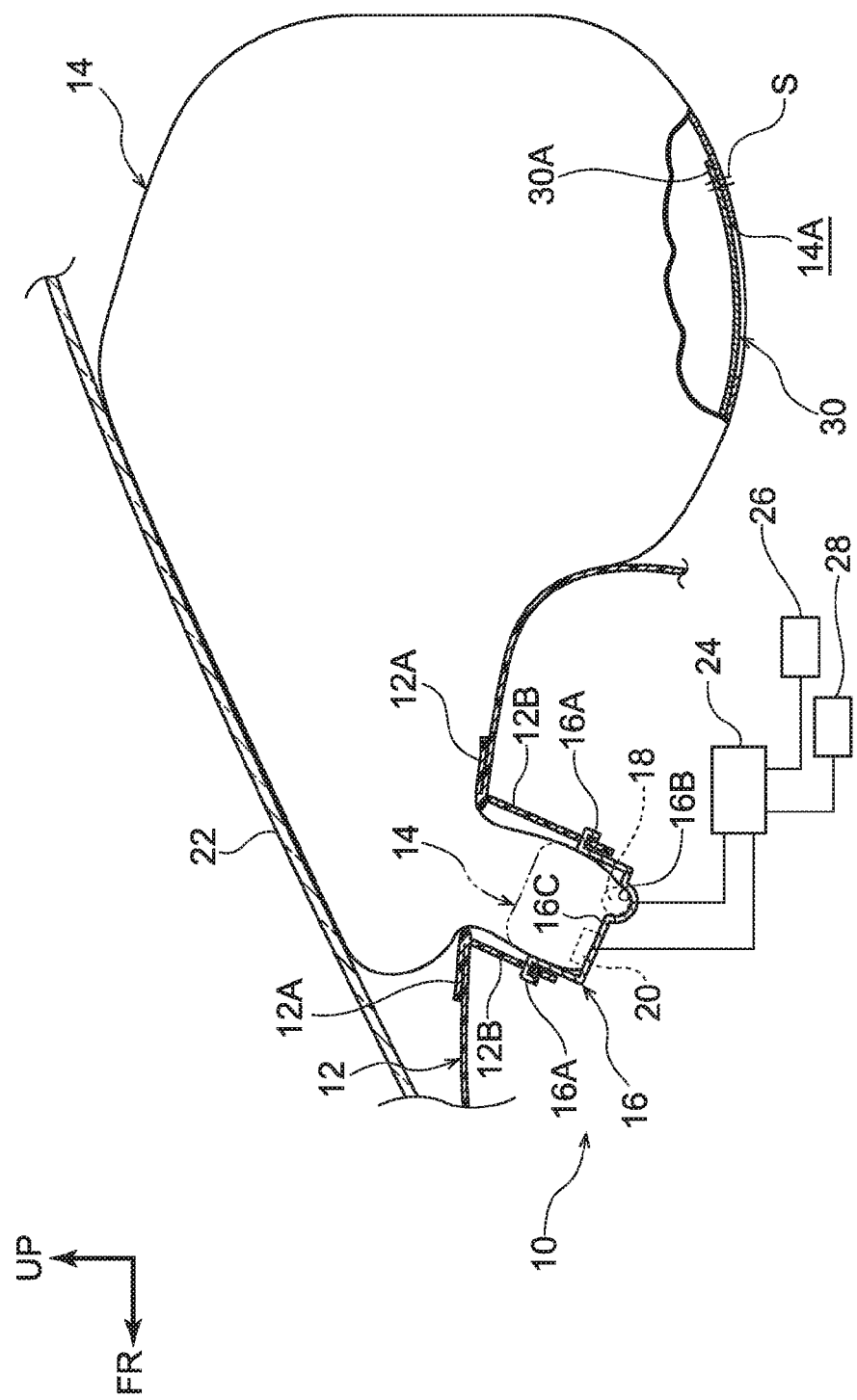
FIG. 1 is a cross-section of a vehicle front section applied with a vehicle airbag device according to a first exemplary embodiment as viewed from the vehicle width direction, illustrating a state in which a vehicle collision has been determined to be unavoidable and gas has been supplied into an airbag from a first inflator.

As illustrated in FIG. 1, a vehicle airbag device 10 (hereafter referred to as "airbag device 10" as appropriate) is provided at a vehicle front side of a cabin, and is disposed inside an instrument panel 12 at the vehicle front of a front passenger seat in the present exemplary embodiment as an example. The airbag device 10 is configured including an airbag 14, an airbag case (retainer) 16 in which the airbag 14 is stowed, a first inflator 18 serving as a pre-collision gas supply section, and a second inflator 20 serving as a mid-collision gas supply section.

As an example, the airbag 14 is configured in a bag shape by stitching together outer peripheral portions of two base cloths, and is stowed in the airbag case 16 in a folded state using a predetermined folding method, such as pleating or rolling (see the double-dotted dashed lines in FIG. 1). On receiving gas supplied from the first inflator 18 and the second inflator 20, described later, the airbag 14 is configured so as to be inflated and deployed toward an occupant seated in a vehicle seat on the front passenger seat side, not illustrated in the drawings.

Note that door sections 12A are formed in the instrument panel 12. The door sections 12A are formed at locations of the instrument panel 12 positioned below a lower portion of a windshield 22, and are closed in a normal state prior to the airbag 14 being inflated and deployed. When the airbag 14 is inflated and deployed, the door sections 12A are split along a non-illustrated tear line under the inflation pressure of the airbag 14, and are deployed so as to open out in both the front and rear directions. The airbag 14 is thereby inflated and deployed toward the occupant seated in the front passenger seat. A vent hole 14A is formed in a lower portion of the airbag 14, and the vent hole 14A is covered from inside the airbag 14 by a tether 30. The tether 30 is explained later.

The airbag case 16 is attached to flanges 12B of the instrument panel 12. The flanges 12B extend out from base portions of the respective door sections 12A toward the instrument panel 12 interior, and the airbag case 16 is attached to lower ends of the flanges 12B.

The airbag case 16 is formed in a box shape open toward the vehicle upward, and is formed in substantially a hat shape open toward the vehicle upward in a cross-section as viewed from the vehicle width direction. Note that hook shaped attachment hooks 16A respectively extend out from upper ends of the airbag case 16 toward the vehicle front and vehicle rear. The attachment hooks 16A are inserted into and anchored to attachment holes formed in the flanges 12B, thereby attaching the airbag case 16 to the flanges 12B.

An indentation 16B that is indented in a substantially circular arc shape toward the vehicle downward is formed in a bottom portion 16C of the airbag case 16. The first inflator 18 is attached to the indentation 16B. The second inflator 20 is attached to the bottom portion 16C of the airbag case 16 further toward the vehicle front than the first inflator 18.

The first inflator 18 is formed in a substantially circular tube shape (cylinder shape) with its length direction along the vehicle width direction, and is configured by what is referred to as a hybrid inflator that combines a pyrotechnic and compressed gas to generate gas. Non-illustrated gas ejection ports are formed in an outer peripheral face at one length direction end of the first inflator 18, and a low temperature (approximately 150° C.) gas is ejected through the gas ejection ports. The first inflator 18, which is electrically connected to an Electronic Control Unit (ECU) 24, this being a controller, is actuated based on a signal from the ECU 24 and supplies gas into the airbag 14. The ECU 24 is explained later.

The second inflator 20, which is formed in a substantially circular plate shape, is attached to the bottom portion 16C of the airbag case 16, and is what is referred to as a pyro inflator that generates gas by combusting a pyrotechnic. Non-illustrated gas ejection ports are formed in the second inflator 20, and a high temperature (approximately 800° C.) gas is ejected through the gas ejection ports. Namely, gas ejected from the second inflator 20 is at a higher temperature than gas ejected from the first inflator 18. In other words, the first inflator 18 is configured to supply gas into the airbag 14 at a lower temperature than the temperature of gas supplied into the airbag 14 from the second inflator 20. The second inflator 20, which is electrically connected to the ECU 24, is actuated based on a signal from the ECU 24 and supplies gas into the airbag 14.

Note that the tether 30 is attached inside the airbag 14, and the vent hole 14A of the airbag 14 is closed off by the tether 30. The tether 30 is formed by an elongated shaped cloth, and is disposed along an inner face at the lower portion side of the airbag 14 in an inflated and deployed state. One end 30A of the tether 30 extends further toward the vehicle rear than the vent hole 14A, and is stitched to the airbag 14 at a stitch portion S.

Figure 2A:
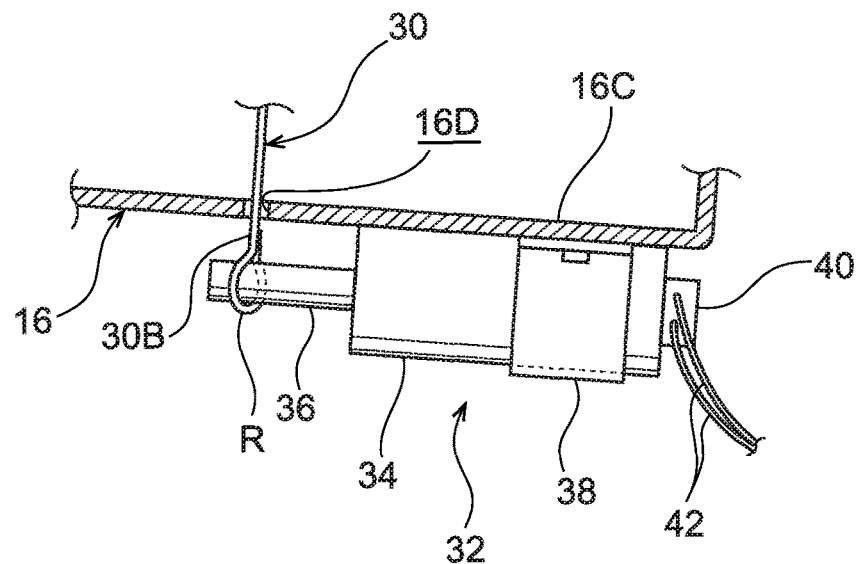
FIG. 2A is a drawing illustrating an actuator configuring a vehicle airbag device according to the first exemplary embodiment, illustrating a state in which another end of a tether has been anchored.
Figure 2B:
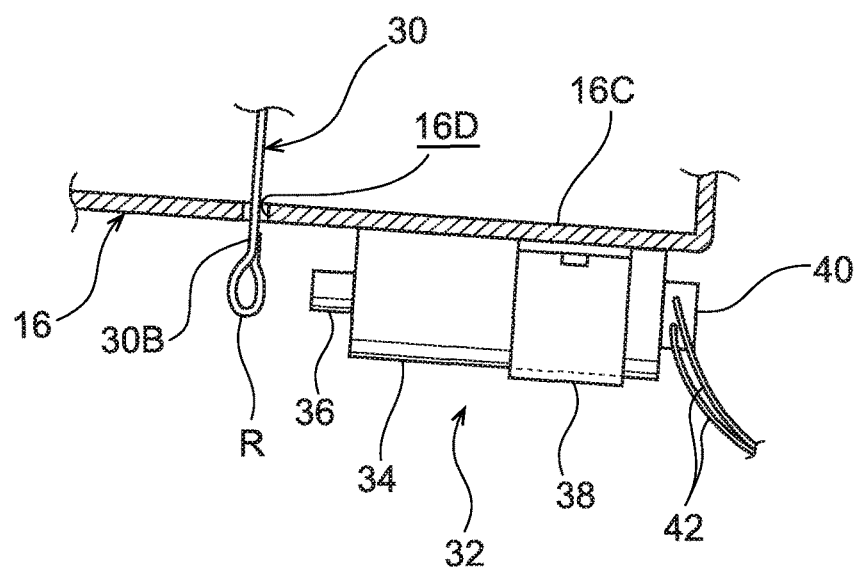
FIG. 2B is a drawing illustrating an actuator configuring a vehicle airbag device according to the first exemplary embodiment, illustrating a state in which an anchored state of another end of a tether has been released.

As illustrated in FIGS. 2A and 2B, another end 30B of the tether 30 extends to the bottom portion 16C of the airbag case 16, and is inserted through an insertion hole 16D formed in the bottom portion 16C of the airbag case 16. The other end 30B is thereby positioned outside the airbag case 16, and a ring shaped ring portion R is formed on the other end 30B. A rod 36 of an actuator 32 attached to the airbag case 16 is passed through the ring portion R.

The actuator 32 is disposed on a lower face of the bottom portion 16C of the airbag case 16, and is fixed to the bottom portion 16C of the airbag case 16 by a substantially semi-circular arc shaped bracket 38. The actuator 32 is configured including an actuator body 34, a connector 40, and the rod 36.

The actuator body 34, which is formed in a substantially circular tube shape, is supported by the bracket 38 from below, and abuts the bottom portion 16C of the airbag case 16. The connector 40 is fixed to one axial direction end of the actuator body 34. One or plural signal wires 42 are connected to the connector 40, and the connector 40 is electrically connected to the ECU 24 through the signal wires 42 (two signal wires 42 are connected in FIGS. 2A and 2B).

The rod shaped rod 36 projects out from another axial direction end of the actuator 32. Note that, in a non-actuated state prior to the actuator 32 being actuated, the rod 36 is positioned in a projecting position projecting out from the actuator body 34 toward the vehicle front side as illustrated in FIG. 2A. The rod 36 passes through the ring portion R formed at the other end 30B of the tether 30. The other end 30B of the tether 30 is accordingly anchored to the actuator 32.

As illustrated in FIG. 2B, after the actuator 32 is actuated based on a signal from the ECU 24, the rod 36 is displaced to a retracted position retracted toward the actuator body 34. The rod 36 is accordingly pulled out from the ring portion R, and an anchored state of the rod 36 by the ring portion R is released. Namely, an attached state of the tether 30 is released. Note that, as an example, displacement of the rod 36 is performed by gas generated by a non-illustrated micro gas generator (hereafter referred to as "MGG" as appropriate) provided inside the actuator body 34. The actuator 32 is configured so as to be actuated during a collision or after a collision of the vehicle.

As illustrated in FIG. 1, the ECU 24 is electrically connected to a pre-crash sensor such as a collision prediction sensor 26, and a collision sensor 28 (or to a group of sensors). After the ECU 24 has determined that a vehicle collision is unavoidable based on a signal from the collision prediction sensor 26, the ECU 24 actuates the first inflator 18, this being the pre-collision gas supply section, and gas is supplied into the airbag 14. As an example, the collision prediction sensor 26 is configured including a non-illustrated stereo camera provided in the vicinity of the vehicle width direction center of an upper portion of the windshield 22, for example. The stereo camera images in front of the vehicle so as to detect a colliding body coming toward the vehicle. The distance to the colliding body detected by the stereo camera, the relative speeds of the vehicle and the colliding body, and so on are measured, and the measured data is output to the ECU 24. The ECU 24 determines whether or not a vehicle collision is unavoidable based on the measured data from the stereo camera. The collision prediction sensor 26 may be configured by millimeter wave radar or the like.

After the ECU 24 has detected a vehicle collision based on a signal from the collision sensor 28 (during a vehicle collision), the ECU 24 actuates the second inflator 20, this being a mid-collision gas supply section, and gas is supplied into the airbag 14. As an example, the collision sensor 28 is configured including a front satellite sensor formed of an acceleration sensor disposed on a front side member, and a floor sensor formed of an acceleration sensor installed in the floor below a center console.

Operation of Vehicle Airbag Device

Explanation follows regarding operation of the vehicle airbag device 10 according to the present exemplary embodiment. First, in a state prior to the airbag 14 being inflated and deployed, the airbag 14 is stowed in the airbag case 16 in a folded state as illustrated by the double-dotted dashed lines in FIG. 1.

Note that the ECU 24 actuates the first inflator 18 on determining that a vehicle collision is unavoidable based on a signal from the collision prediction sensor 26. Gas is thereby supplied from the first inflator 18 into the airbag 14, and the airbag 14 opens the door sections 12A of the instrument panel 12 and is inflated and deployed toward the occupant side. When this occurs, since the one end 30A of the tether 30 is stitched to the airbag 14 and the other end 30B of the tether 30 is anchored to the rod 36 of the actuator 32 (see FIG. 2A), the tether 30 is in the attached state attached to the airbag 14. The vent hole 14A is closed off by the tether 30.

Figure 3:
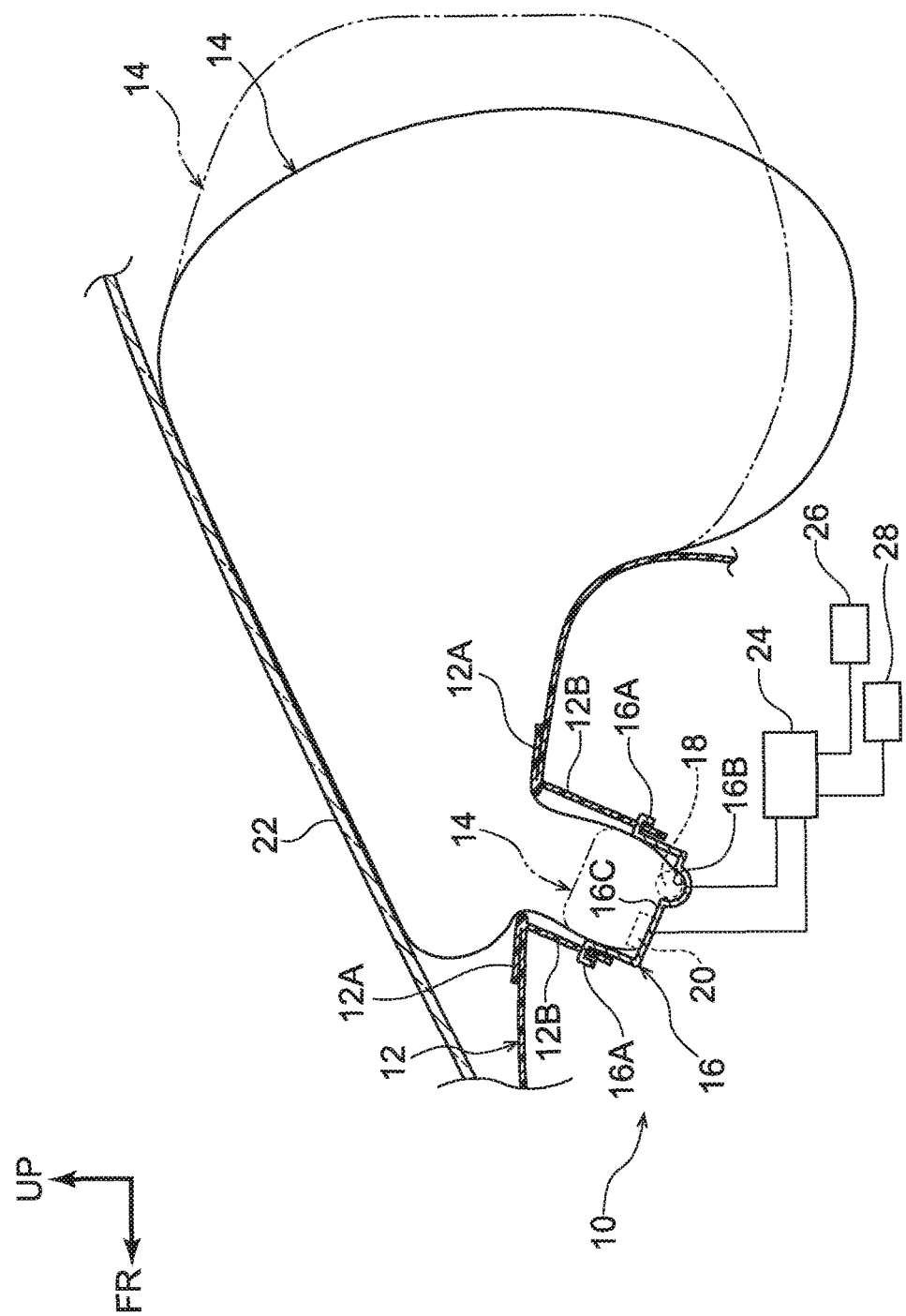
FIG. 3 is a drawing corresponding to FIG. 1, illustrating a state in which the internal pressure of the airbag has dropped compared to the state in FIG. 1.

As illustrated in FIG. 3, after the first inflator 18 has been actuated and the airbag 14 has been inflated and deployed, the internal pressure of the airbag 14 drops until the second inflator 20 is actuated (see the double-dotted dashed lines in FIG. 3). This is caused by factors such as a drop in temperature of the gas inside the airbag 14, and a slight leakage of gas through the weave of the base cloths of the airbag 14 to the airbag 14 exterior.

Figure 4:
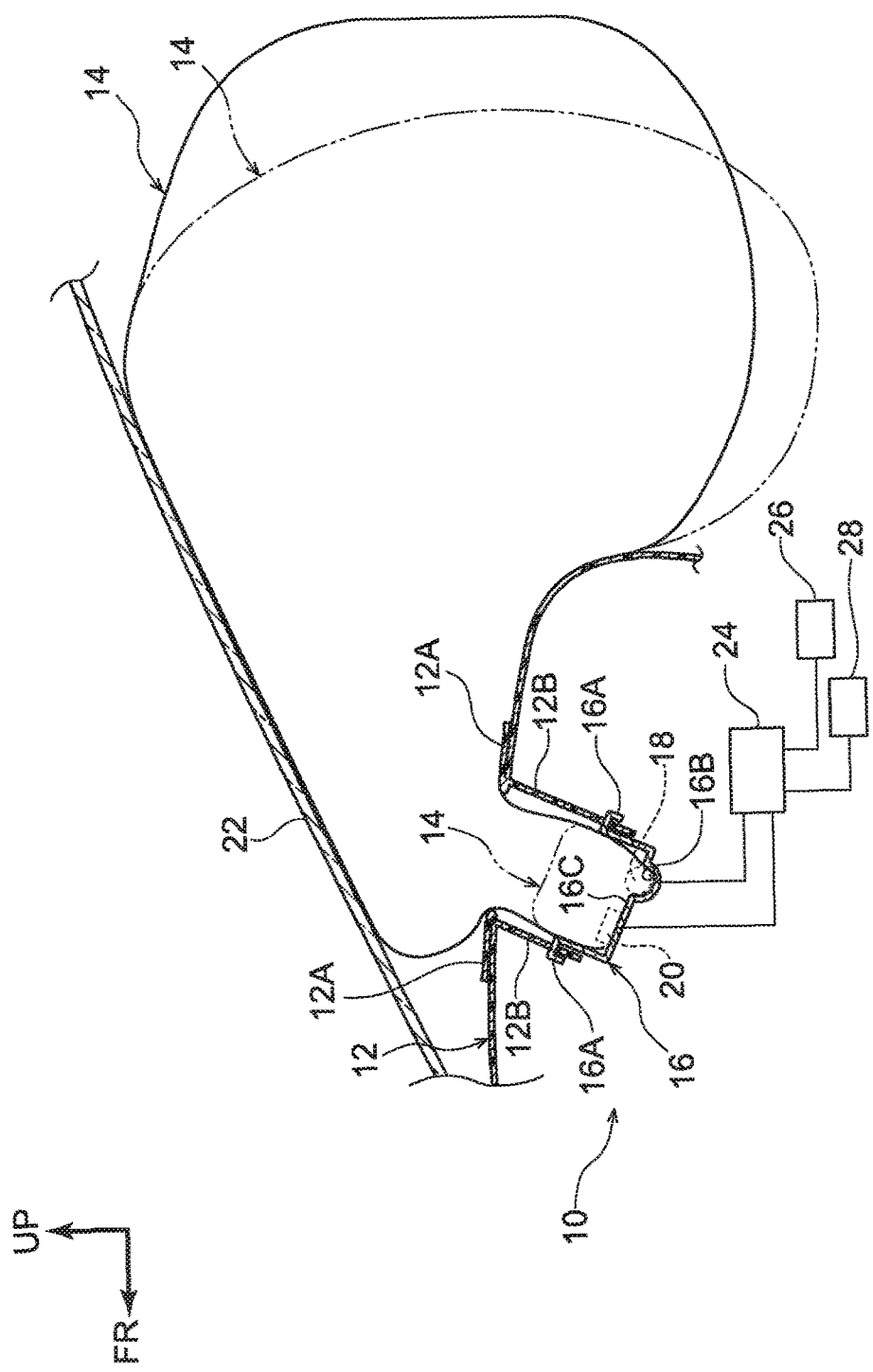
FIG. 4 is a drawing corresponding to FIG. 1, illustrating a state in which a vehicle collision has been detected and gas has been supplied from a second inflator compared to the state in FIG. 3.

Next, the ECU 24 actuates the second inflator 20 on detecting a vehicle collision based on a signal from the collision sensor 28. Thus, as illustrated by the solid line in FIG. 4, gas is supplied into the airbag 14 from the second inflator 20, and the airbag 14 is inflated further. In particular, the temperature of gas supplied into the airbag 14 from the second inflator 20 is at a higher temperature than the temperature of gas supplied into the airbag 14 from the first inflator 18, such that the internal pressure of the airbag 14 rises.

Figure 5:
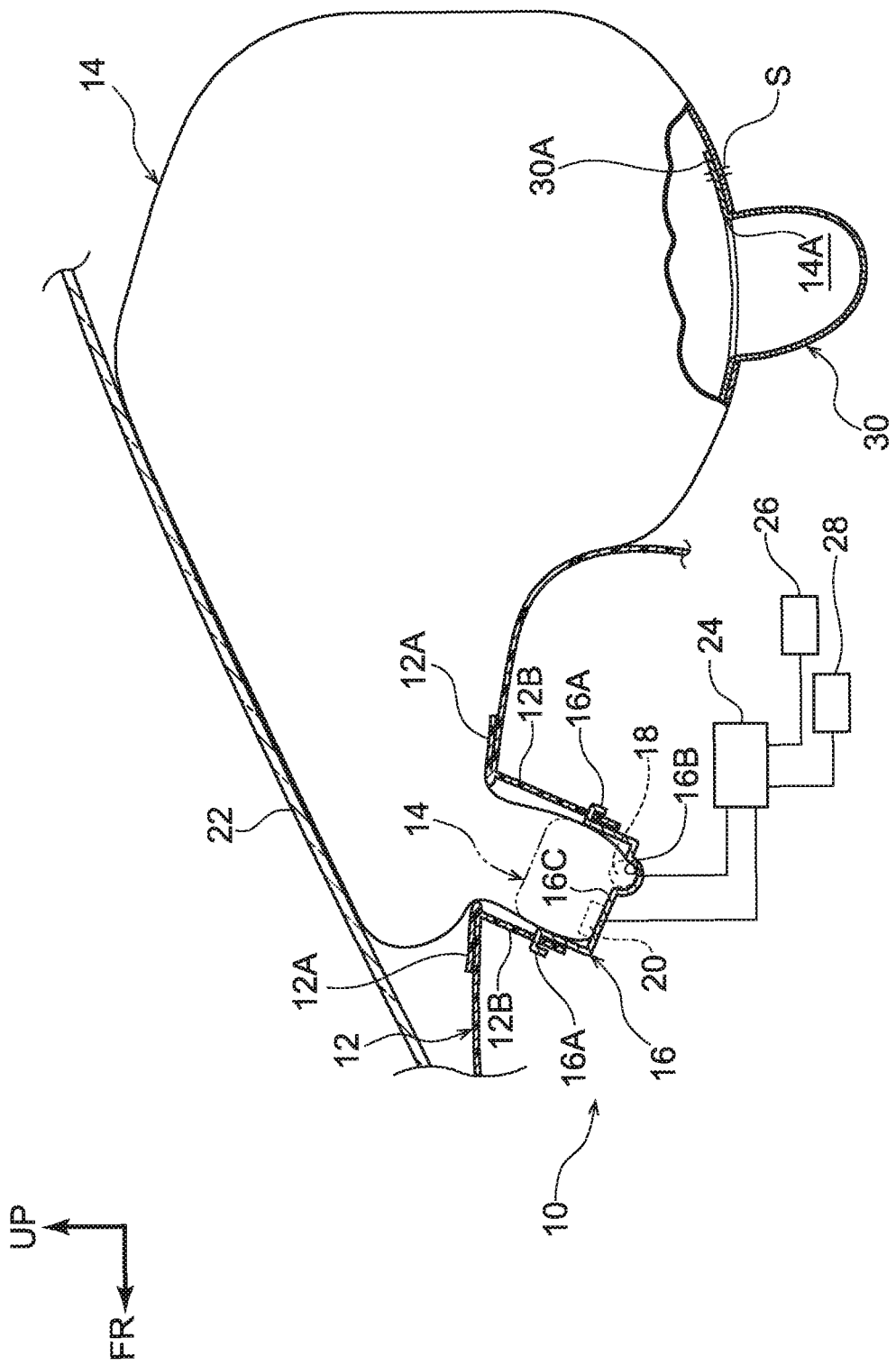
FIG. 5 is a drawing corresponding to FIG. 1, illustrating a state in which a vent hole has been opened compared to the state in FIG. 4.

The ECU 24 actuates the actuator 32 at the same as actuating the second inflator 20, or after having actuated the second inflator 20. Thus, as illustrated in FIG. 2B, the rod 36 is displaced from the projecting position to the retracted position, and the rod 36 is pulled out of the ring portion R on the other end 30B of the tether 30. Namely, the attached state of the tether 30 is released. Thus, as illustrated in FIG. 5, a portion of the tether 30 other than the one end 30A is pressed out (falls out) through the vent hole 14A due to the pressure difference between the inside and the outside of the airbag 14. Thus, the vent hole 14A is opened, some of the gas inside the airbag 14 flows out to the exterior, and the internal pressure of the airbag 14 is adjusted to an optimal pressure.

Operation

Explanation follows regarding operation of the present exemplary embodiment.

In the present exemplary embodiment, gas is supplied into the airbag 14 from the first inflator 18, and the airbag 14 is inflated and deployed when it has been determined that a vehicle collision is unavoidable. Gas is then supplied into the airbag 14 from the second inflator 20 during the vehicle collision. This enables the airbag 14 to be inflated prior to a vehicle collision and enables gas to be further supplied into the airbag 14 during the vehicle collision. Thus since, for example, at a front-end collision of the vehicle, the airbag 14 has already been inflated and deployed, movement under inertia of the occupant toward the vehicle front can be restrained by the airbag 14, and initial restraint performance of the occupant can be improved.

Gas supplied into the airbag 14 from the first inflator 18 prior to a collision is gas at a lower temperature than gas supplied into the airbag 14 from the second inflator 20 during the collision. This enables a sudden drop in temperature of the gas to be suppressed, and enables a drop in the internal pressure of the airbag due to the drop in gas temperature to be suppressed, compared to cases in which gas supplied into the airbag 14 from the first inflator 18 is at a high temperature. In contrast thereto, during the collision, gas is supplied into the airbag 14 from the second inflator 20 at a higher temperature than gas supplied into the airbag 14 from the first inflator 18. The temperature of gas that has been filled into the airbag 14 rises accordingly, thereby enabling the internal pressure of the airbag 14 to be raised. This enables the internal pressure of the airbag 14 to be maintained until the collision has occurred, while improving initial restraint performance of the occupant.

In the present exemplary embodiment, the vent hole 14A is formed in the airbag 14, and the vent hole 14A is closed off by the tether 30 attached to the airbag 14. The anchored state (attached state) of the other end 30B of the tether 30 is released during a vehicle collision or after the collision, such that a portion of the tether 30 other than the one end 30A is pressed out through the vent hole 14A and the vent hole 14A is opened. Some of the gas inside the airbag 14 thereby flows out to the exterior, enabling an excessive rise in the internal pressure of the airbag 14 when restraining the occupant to be suppressed. Namely, the internal pressure of the airbag 14 when restraining the occupant can be optimized.

Note that in the present exemplary embodiment, as illustrated in FIGS. 2A and 2B, the other end 30B of the tether 30 is released from the anchored state due to the rod 36 of the actuator 32 being displaced; however, there is no limitation thereto. For example, the structure of a modified example illustrated in FIGS. 6A and 6B may be adopted instead.

Modified Example

Figure 6A:
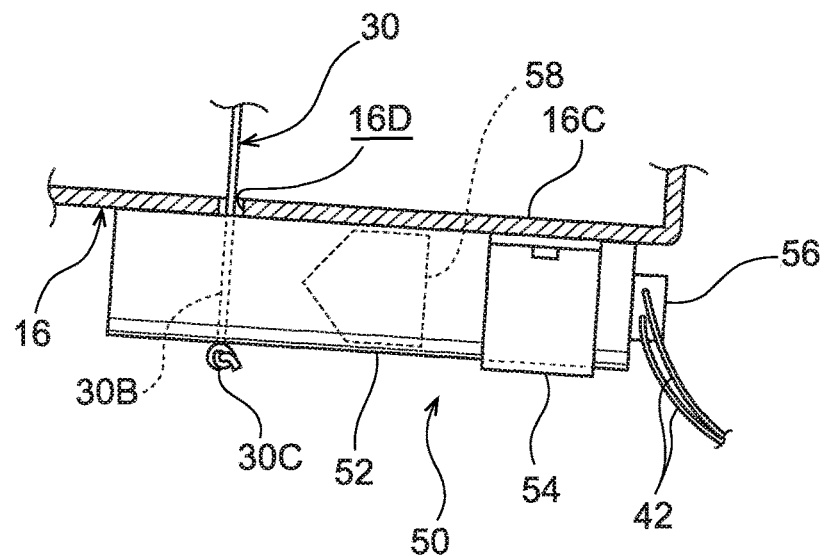
FIG. 6A is a drawing illustrating a modified example of an actuator configuring a vehicle airbag device according to the first exemplary embodiment, illustrating a state in which another end of a tether has been anchored.
Figure 6B:
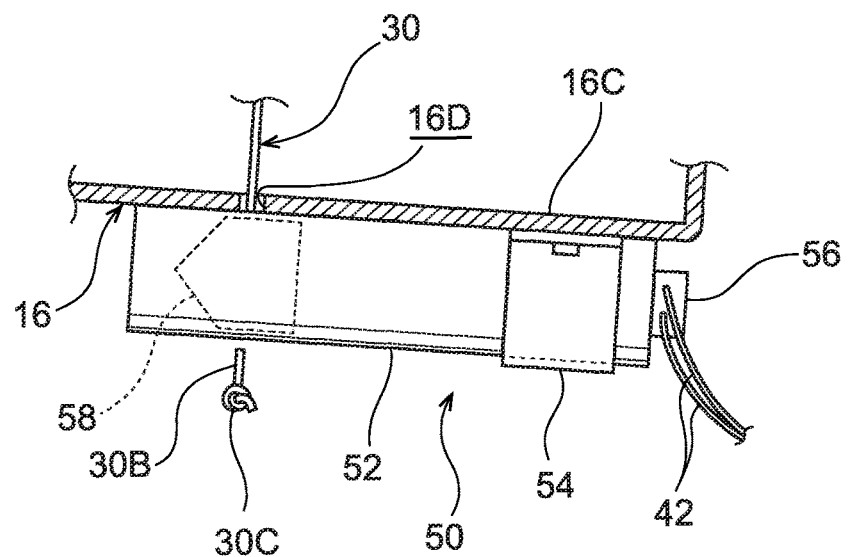
FIG. 6B is a drawing illustrating a modified example of an actuator configuring a vehicle airbag device according to the first exemplary embodiment, illustrating a state in which another end of a tether has been cut.

As illustrated in FIGS. 6A and 6B, an actuator 50 of the present modified example is disposed on the lower face of the bottom portion 16C of the airbag case 16, and is fixed to the bottom portion 16C of the airbag case 16 by a substantially semicircular arc shaped bracket 54. The actuator 50 is configured including an actuator body 52, a connector 56, and a cutter 58.

The actuator body 52, which is formed in a substantially circular tube shape, is supported from below by the bracket 54, and abuts the bottom portion 16C of the airbag case 16. The connector 56 is fixed to one axial direction end of the actuator body 52. Two signal wires 42 are connected to the connector 56, and the ECU 24 and the connector 56 are electrically connected together through the signal wires 42.

Note that the other end 30B of the tether 30 inserted through the insertion hole 16D passes through inside the actuator body 52, extends below the actuator body 52, and is formed with a knot 30C. The knot 30C is anchored to the actuator body 52.

The cutter 58 is housed inside the actuator body 52. Note that, as illustrated in FIG. 6A, the cutter 58 is positioned further toward the connector 56 side than the tether 30 in a non-actuated state prior to the actuator 50 being actuated.

As illustrated in FIG. 6B, after the actuator 50 is actuated based on a signal from the ECU 24, gas is generated by an MGG provided inside the actuator body 52, and the cutter 58 is moved toward the tether 30. The other end 30B of the tether 30 is thereby cut, and the anchored state (attached state) of the tether 30 is released. The vent hole 14A can be opened during a vehicle collision or after the collision in cases in which the structure explained above is adopted.

Second Exemplary Embodiment

Figure 7:
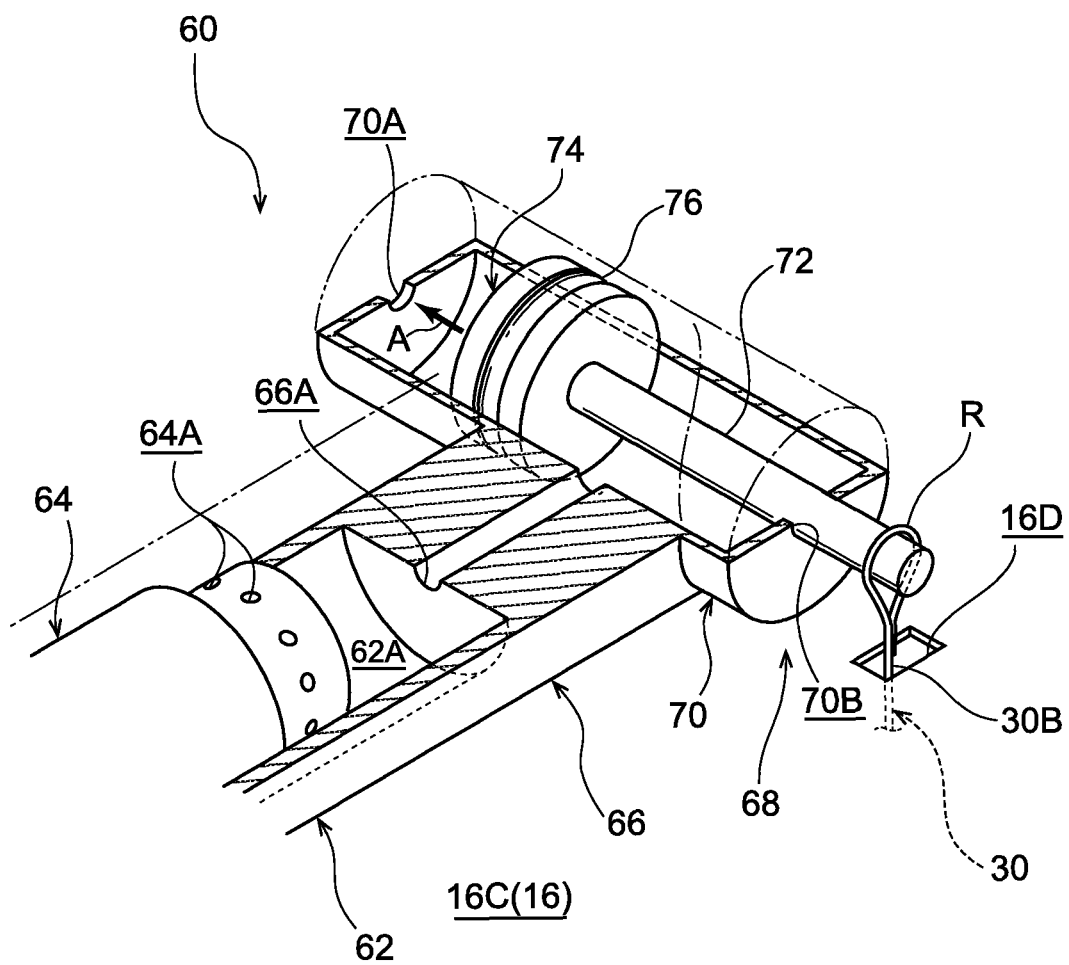
FIG. 7 is a partially sectioned perspective view illustrating a second inflator and an actuator configuring a vehicle airbag device according to a second exemplary embodiment.

Explanation follows regarding a vehicle airbag device according to a second exemplary embodiment, with reference to FIG. 7. Note that similar configuration to that in the first exemplary embodiment is appended with the same reference numerals, and explanation thereof is omitted as appropriate.

FIG. 7 is an enlarged perspective view illustrating relevant portions of the bottom portion 16C of the airbag case 16 configuring an outer casing of a vehicle airbag device 60 (hereafter referred to as "airbag device 60" as appropriate) according to the present exemplary embodiment, as viewed from a back face. As illustrated in FIG. 7, a substantially circular tube shaped inflator housing section 62 is provided at the bottom portion 16C of the airbag case 16 in the airbag device 60. A second inflator 64, serving as a mid-collision gas supply section, is housed in an interior space 62A of the inflator housing section 62. A non-illustrated first inflator configured similarly to that in the first exemplary embodiment is attached to the bottom portion 16C of the airbag case 16.

The second inflator 64 is formed in a substantially circular tube shape (cylindrical shape) with its length direction along the vehicle width direction, and is configured by what is referred to as a hybrid inflator that combines a pyrotechnic and a compressed gas to generate gas. Gas ejection ports 64A are formed in an outer peripheral face at one length direction end of the second inflator 64, and gas is ejected from the gas ejection ports 64A and supplied into the airbag when the second inflator 64 is actuated.

Note that a gas flow-path 66A, which is separate from the flow-path that supplies gas into the airbag, is connected to the second inflator 64. The gas flow-path 66A pierces through the inside of a substantially circular column shaped flow-path formation section 66 formed continuously to the inflator housing section 62, and extends along the axial direction of the second inflator 64. One end of the gas flow-path 66A is in communication with the interior space 62A of the inflator housing section 62, and another end of the gas flow-path 66A is in communication with the inside of an actuator 68.

The actuator 68 is configured including an actuator body 70, a rod 72, and a sliding body 74. The actuator body 70 is formed in a substantially circular tube shape with both sides closed and its length direction along a direction orthogonal to an extension direction of the gas flow-path 66A. A communication hole 70A is formed in one length direction end of the actuator body 70, and the actuator body 70 interior and exterior are placed in communication with each other through the communication hole 70A.

A communication hole 70B is formed in another length direction end of the actuator body 70, and the rod 72 is inserted through the communication hole 70B. The rod 72 is formed in a rod shape with a smaller diameter than that of the actuator body 70, and is disposed coaxially to the actuator body 70. One end of the rod 72 projects out through the communication hole 70B toward the actuator body 70 exterior. A leading end of the rod 72 is passed through the ring portion R of the other end 30B of the tether 30 inserted through the insertion hole 16D.

Another end of the rod 72 is positioned inside the actuator body 70, and the sliding body 74 is provided at the other end of the rod 72. The sliding body 74 is formed in a substantially circular column shape with a slightly smaller diameter than the internal diameter of the actuator body 70. Part of an outer circumferential face of the sliding body 74 is made narrower, and an O ring 76 is fitted into this narrowed portion. The O ring 76 resiliently abuts an inner face of the actuator body 70 and partitions the interior space of the actuator body 70. The sliding body 74 is disposed in a position further away from the tether 30 than a connecting portion between the actuator body 70 and the gas flow-path 66A.

Note that when the ECU 24 actuates the second inflator 64 based on a signal from the collision sensor 28, most of the gas ejected through the gas ejection ports 64A of the second inflator 64 is supplied into the airbag. However, some of the gas ejected through the gas ejection ports 64A flows through the gas flow-path 66A and flows into the actuator body 70. Thus, in the interior space of the actuator body 70, the pressure in the space on the side in communication with the gas flow-path 66A rises, and the sliding body 74 is made to slide in a direction in which this space widens (the arrow A direction in FIG. 7). The rod 72 retreats toward the actuator body 70, and is pulled out from the ring portion R formed in the other end 30B of the tether 30 as a result. Namely, the attached state of the tether 30 is released, and the vent hole 14A formed in the airbag 14 is opened (see FIG. 5).

Operation

Explanation follows regarding operation of the present exemplary embodiment.

In the present exemplary embodiment, the attached state of the tether 30 is released on receiving gas supplied from the second inflator 64, such that a dedicated drive source is not required to release the attached state of the tether 30, unlike in the actuator 32 of the first exemplary embodiment. This enables the number of components in the airbag device 60 to be reduced. Other operation is similar to that in the first exemplary embodiment.

Vehicle airbag devices according to a first exemplary embodiment and a second exemplary embodiment of the present disclosure have been explained above; however, obviously various modifications may be implemented within a range not departing from the spirit of the present disclosure. For example, in the above exemplary embodiments and modified example, the present disclosure is applied to an airbag disposed inside the instrument panel 12 at the vehicle front of the front passenger seat. However, there is no limitation thereto, and the configuration of the present disclosure may be applied to a driver seat airbag or a rear passenger seat airbag.

In the first exemplary embodiment, a hybrid inflator is employed as the first inflator 18 to supply gas prior to a collision, and a pyro inflator is employed as the second inflator 20 to supply gas during a collision; however, there is no limitation thereto. For example, a hybrid inflator may be employed as a second inflator, similarly to in the second exemplary embodiment.

Furthermore, a dual type inflator including two squibs and two combustion chambers may be employed instead of the first inflator and the second inflator. As an example thereof, a structure may be employed in which a tube shaped body is partitioned into two combustion chambers, gas is generated in one combustion chamber after a vehicle collision is determined to be unavoidable, and gas is generated in the other combustion chamber during the vehicle collision. When this is performed, the temperature of gas supplied into the airbag can be changed by heating the gas using different heating agents. Namely, a drop in airbag internal pressure due to a drop in the gas temperature can be suppressed by employing a low temperature gas heating agent to generate gas prior to a collision. In contrast thereto, the temperature of gas inside the airbag can be raised and the internal pressure of the airbag raised by employing a high temperature gas heating agent to generate gas during the collision.

In the above exemplary embodiments and modified example, the vent hole is closed off by the tether in a state prior to the second inflator being actuated; however, there is no limitation thereto. For example, a configuration may be applied in which part of the vent hole is covered by the tether. In such cases, part of the vent hole is open in a state in which the first inflator has been actuated and the airbag has been inflated and deployed, thereby enabling some of the gas inside the airbag to be discharged, and excessive inflation of the airbag to be suppressed. Then, the vent hole is completely opened when the attached state of the tether is released after actuation of the second inflator. The internal pressure of the airbag may be adjusted so as to be optimized by changing the size of the vent hole in this manner.

In the second exemplary embodiment, the attached state of the tether is released by displacing the rod of the actuator using gas supplied from the second inflator. However, there is no limitation thereto, and the attached state of the tether may be released by another method. For example, a configuration may be applied in which a cutter is housed inside the actuator, and the cutter is moved and made to cut the tether using gas supplied from the second inflator.

What is claimed is:

1. A vehicle airbag device comprising:
    an airbag that is folded and stowed inside an airbag case, the airbag being inflated and deployed on being supplied with gas;
    a mid-collision gas supply section that is provided at the airbag case, the mid-collision gas supply section supplying a first gas into the airbag during a vehicle collision; and
    a pre-collision gas supply section that is provided at the airbag case, the pre-collision gas supply section supplying a second gas into the airbag in a case in which it has been determined prior to the vehicle collision that the vehicle collision is unavoidable, the second gas being supplied into the airbag by the pre-collision gas supply section at a second temperature that is lower than a first temperature at which the first gas is supplied into the airbag by the mid-collision gas supply section.

2. A vehicle airbag device comprising:
    an airbag that is folded and stowed inside an airbag case, the airbag being inflated and deployed on being supplied with gas;

a mid-collision gas supply section that is provided at the airbag case, the mid-collision gas supply section supplying a first gas into the airbag during a vehicle collision;

a pre-collision gas supply section that is provided at the airbag case, the pre-collision gas supply section supplying a second gas into the airbag in a case in which it has been determined prior to the vehicle collision that the vehicle collision is unavoidable, the second gas being supplied into the airbag by the pre-collision gas supply section at a second temperature that is lower than a first temperature at which the first gas is supplied into the airbag by the mid-collision gas supply section;

a tether that is attached to the airbag, the tether covering at least a part of a vent hole formed in the airbag; and an actuator that releases an attached state of the tether so as to open the vent hole during the vehicle collision or after the vehicle collision.

3. A vehicle airbag device comprising:

an airbag that is folded and stowed inside an airbag case, the airbag being inflated and deployed on being supplied with gas;

a mid-collision gas supply section that is provided at the airbag case, the mid-collision gas supply section supplying a first gas into the airbag during a vehicle collision;

a pre-collision gas supply section that is provided at the airbag case, the pre-collision gas supply section supplying a second gas into the airbag in a case in which it has been determined prior to the vehicle collision that the vehicle collision is unavoidable, the second gas being supplied into the airbag by the pre-collision gas supply section at a second temperature that is lower than a first temperature at which the first gas is supplied into the airbag by the mid-collision gas supply section;

a tether that is attached to the airbag, the tether covering at least a part of a vent hole formed in the airbag; and an actuator that releases an attached state of the tether so as to open the vent hole during the vehicle collision or after the vehicle collision, wherein the actuator is connected to a gas flow-path through which the first gas generated in the mid-collision gas supply section flows, and the actuator releases the attached state of the tether on receiving the first gas supplied from the mid-collision gas supply section.

4. The vehicle airbag device of claim 1, wherein the mid-collision gas supply section is a pyro inflator that generates the first gas by combusting a first pyrotechnic, and the pre-collision gas supply section is a hybrid inflator that uses a compressed gas and combusts a second pyrotechnic to generate the second gas.

\* \* \* \* \*